United States Patent Office 3,751,548
Patented Aug. 7, 1973

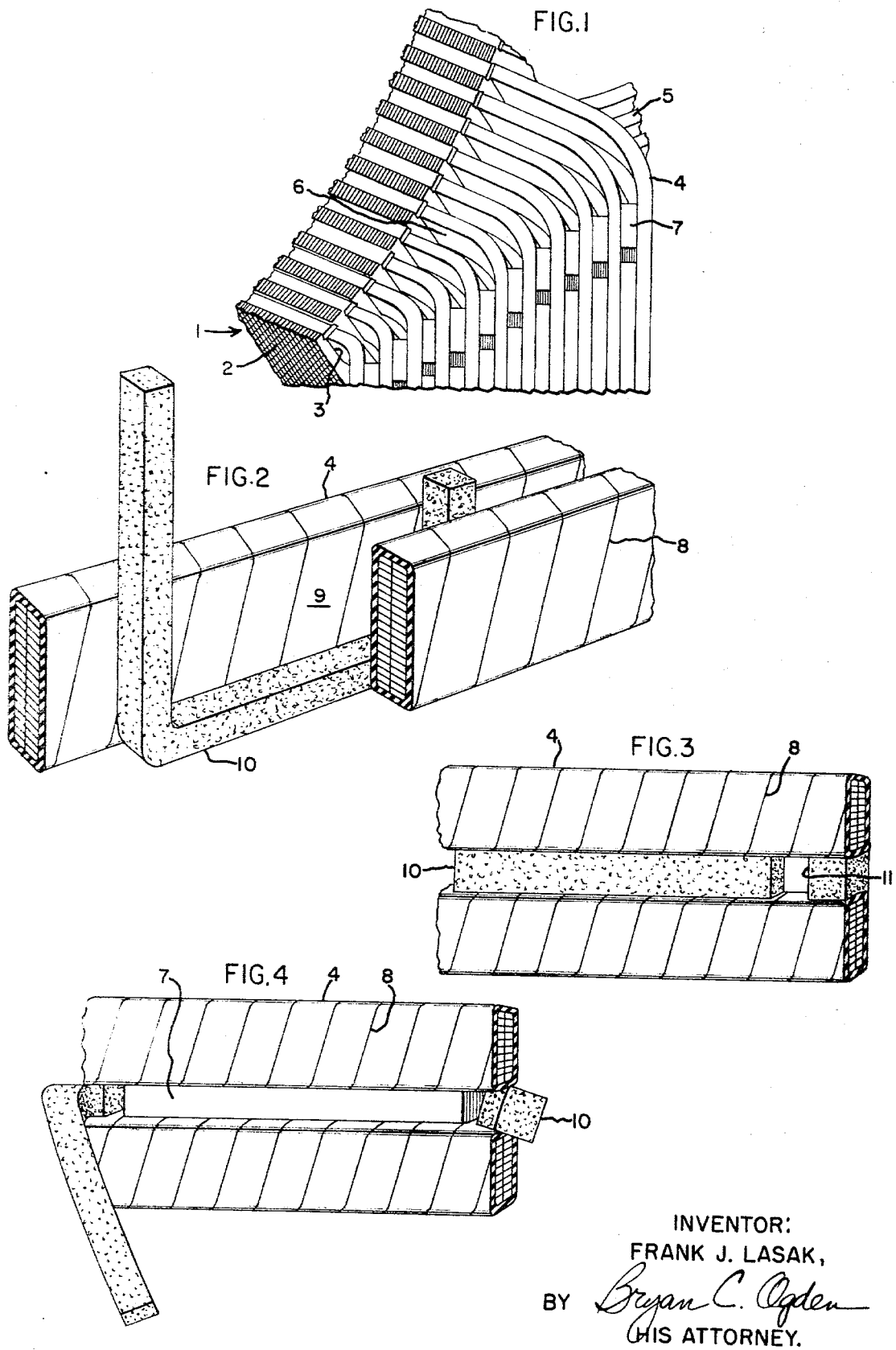

3,751,548
FORMED-IN-PLACE STATOR END WINDING
BLOCKS FOR A DYNAMOELECTRIC MACHINE
Frank J. Lasak, Schenectady, N.Y., assignor to
General Electric Company
Filed Oct. 8, 1970, Ser. No. 79,094
Int. Cl. H02k 3/46
U.S. Cl. 264—261                                    6 Claims

ABSTRACT OF THE DISCLOSURE

A method of forming the stator end windnig blocks of a large dynamoelectric machine is described whereby the end winding blocks are cast in place. The method is practiced by forming a mold cavity of a resilient sponge rubber material, between bar members, filling the cavity with a curable liquid plastic material, preferably a urethane rubber, and then curing the liquid material such that it is converted to a solid elastomer. When forming the spacer blocks of a large generator, a number of such mold cavities can be formed and then the cavities may be filled while the generator is periodically rotated, allowing each end winding block to partially cure before rotation to the next position, thereby preventing spillage.

BACKGROUND OF THE INVENTION

This invention relates generally to formed-in-place spacer blocks and more particularly to an improved method for producing spacer blocks for maintaining electrical conductors in proper spaced relationship, as in the end winding region of an electromagentic device such as a motor, generator, transformer, or like apparatus.

In many types of such electrical equipment, is is necessary to hold the electrical conductors in a spaced apart relationship. Sometimes this is done for cooling purposes; other times, to provide proper alignment for electrical connections. Very often this is done in order to tie the conductor bars together in a rigid structure which will be capable of withstanding mechanical or electrical forces which may be imposed upon it. In large electrical machinery such as a turbine-generator, the conductor bars can be quite large and of substantial weight and are subjected to various forces during the operation of the machine.

Spacer blocks, in order to be effective, must fit the space to be filled with precision in order that there will be no looseness in the structure. An example of a blocking arrangement and method for forming the same may be seen in U.S. Pat. 2,994,735 issued Aug. 1, 1961 in the names of W. L. Marshall and A. D. Coggeshall. Although the spacer block of that patent was able to conform to the space it was to fill, the method of producing such a conformable spacer block was relatively complicated and time-consuming, particularly since a large turbine-generator can require as many as 2000 individual blocks.

With the newer types of thermal setting insulation, the insulated conductor bar of a large electric generator will be quite hard and inflexible. Therefore, it is desirable to provide a spacer block which will conform during assembly to the space which it is later to maintain in operation.

Although there have been many suggestions for such conforming spacer blocks in the past, most of these cure to a fairly hard, rigid mass, as exemplified in U.S. Pat. 2,980,757 issued to A. D. Coggeshall and H. R. Shirk. Movements subsequent to curing have sometimes caused undesirable looseness and fretting. To overcome this, there have been suggestions of resilient spacer blocks as shown in U.S. Pat. 3,027,476 to A. D. Coggeshall. These blocks provide some follow-up action, but are fairly complicated and expensive to manufacture. There have also been suggestions as to pre-formed members of solid elastomeric material for wedging of windings in slots, as shown in U.S. Pat. 3,393,335 to A. Pletenik and T. R. Butman, Jr. Preformed members for bar spacings of various dimensions would require stocking various sizes of spacers. Moreover, there must be provisions for holding the spacers in place, either mechanically or by using adhesives.

All of the foregoing cited patents are assigned to the assignee of the present application.

Lastly, an ideal spacer would provide for slow loading movements such as from thermal expansion, but would resist dynamic vibratory forces or impact forces of the type such as would be experienced under short circuit conditions.

In view of the background just stated, it becomes apparent that an improved low cost method of producing spacer blocks which exactly fit the spacers between winding conductors, would be very desirable. Further, it would be desirable to have an improved method for putting elastomeric spacer blocks in position and bonding them in place.

Accordingly, from the foregoing, one object of the present invention is to provide an improved conforming spacer block which is easy to manufacture.

Another object of the invention is to provide a simple low cost method of producing a blocking member for dynamoelectric machine windings, and for putting it in place.

Another object is to provide a method for providing a self-bonding elastomeric spacer block for dynamoelectric machine windings.

Other objects, advantages and features of the present invention will become apparent from the following description of one embodiment thereof when taken in connection with the accompanying drawing.

SUMMARY OF THE INVENTION

Briefly stated, this invention is practiced in one form by forming a mold cavity between two adjacent bar members with a resilient strip, filling the mold cavity with a liquid plastic material and then allowing the plastic material to cure into a solid, thereby forming the conforming spacer block. In the preferred embodiment, the cured block is an elastomer with self-bonding properties.

BRIEF DESCRIPTION OF THE DRAWING

FIG. 1 is a perspective view showing a portion of the end turn region in a large dynamoelectric machine with conforming spacer blocks in place.

FIG. 2 is a perspective view showing a portion of a pair of conductor bars with the resilient strip mold partially in place.

FIG. 3 is a view of a pair of conductor bars showing the opening which is left in the mold cavity for pouring.

FIG. 4 is a similar view of two conductor bars showing the resilient rubber material being removed after the spacer block has cured.

DESCRIPTION OF THE PREFERRED EMBODIMENT

Referring now to FIG. 1 of the drawing, one environment where the present invention may be utilized includes a generator stator core, a portion of which is generally indicated at 1. Stator core 1 is usually comprised of many laminations of a suitable magnetizable material indicated at 2. Circumferentially spaced about the inner circumference of the stator core 1 are a plurality of radially extending slots 3. Extending axially within the slots 3 in the stator core 1 are conductor bars 4 and 5. At the ends of stator core 1, it is seen that the conductor bars 4 and 5 are radially spaced from one another and generally are bent to run in opposite directions and skewed from the longitudinal axis of the stator core 1. This structure is of course well known in the art and is utilized to form the dynamoelectric machine stator winding pattern.

As the conductor bars 4 and 5 leave the laminated core 1, a spaced apart relationship is necessarily maintained. The spaces between conductor bars are generally indicated at 6. As mentioned in the Background of the Invention, it is necessary that these spaces 6 be maintained with a reasonable degree of accuracy, so that damage resulting from short circuits and the like is prevented. It is well known in the art that in order to maintain the necessary spacing, a plurality of spacer blocks or wedges 7 are positioned and secured between adjacent conductor bars. This environment, that is, the end turn region of a large generator, is one area where the present invention may be practiced.

Although not shown on FIG 1, the plurality of conductor bars in the end turn region are normally tied together in groups and then securely fastened to a supporting structure (not shown). There are many supporting structures and tying systems known to the art, some of which may be seen by reference to the issued U.S. Pats. 3,437,859, 3,344,297, 3,344,296 and 3,135,888.

Turning now to FIG. 2, portions of a pair of bar members are shown in a spaced apart relationship. In FIG. 2, the bar members are portions of top conductor bars 4 shown previously, although they could also represent any insulated conductor. The conducting strands of the bars 4 are wrapped with a suitable insulating tape 8. An example of such a material can be seen by referring to U.S. Pat. 2,707,204 issued Apr. 26, 1955 to C. D. Richardson et al., and assigned to the assignee of the present invention. In that patent, a mica paper tape is continually wrapped about the conducting portion of the bar members 4, such that a layer of insulation is provided. The mica paper tape is coated and impregnated with a mixture of ethoxyline and acidic glyceryl polyester resins.

The present invention is concerned with forming the conforming spacer blocks between adjacent bar members. In the environment as shown in FIG. 1, the conductor bars have been wound in their final position and would be ready for the blocking and tying system. In maintaining the desired spaced apart relationship, the method of the present invention is practiced. In FIG. 2, a mold cavity 9 is formed with a strip of resilient sponge rubber material 10 such that a substantially leakproof mold is formed. In practice, the windings in the stator of a large dynamoelectric machine in the end turn region are designed so as to provide a gap of approximately ½″ between conductor bars. In actual practice, this space 6 could vary up to plus or minus ¼″ of the intended size. Also, due to shifting or variations during bar manufacture, the space may not be uniform in width. In order to contain the liquid plastic material which forms the conforming blocks 7, it is necessary to construct the mold cavity 9 of the aforementioned generally leakproof design. The resilient rubber material is preferably of either a neoprene or silicone open cell sponge rubber strip.

A precut length of sponge rubber, depending upon the size of the conformable spacer block desired, is stretched around a suitable form simulating the size of the block. The form and the sponge rubber strip are then inserted between the two conductor bars 4 in the position where the conformable block 6 is to be cast. It will be appreciated that this procedure will be done at a number of positions in the end turn region. The resilient rubber material is then released and the form removed, allowing the strip to expand, thereby forming the leak-tight mold cavity 9 against the side faces of the conductor bars 4. The advantage of using the open cell sponge rubber material is that it can be compressed up to 50% of its original dimension if necessary. This compressibility covers a wide range of cavity widths for casting of the conforming spacer blocks. Of course, the width of the strip 10 is chosen so that the substantially tight fit will be provided which is in turn dependent upon the spacing between adjacent conductor bars as in the embodiment of FIG. 1.

Referring also to FIG. 3 in addition to FIGS. 1 and 2, the mold cavity 9 is shown in its final form ready for the casting of the conforming spacer block. The portion of the resilient rubber material that extends upwardly from the conductor bars 4 as seen in FIG. 2, is bent over and inserted between the bars so as to form the top of an enclosed mold cavity while leaving an appropriate small opening therein designated as 11. The conductor bars 4, as depicted in FIG. 3, are inclined downwardly on the left side slightly, which is generally their position at the bottom part of the generator end winding. Since the conductor bars are inclined slightly, the additional enclosure means are provided, that is, the resilient rubber material is positioned so as to form only the small opening 11. It will be appreciated that the resilient rubber material could provide three sides to the mold cavity and this would still result in a satisfactory structure for the cavity.

Although the invention, in its broadest sense, does not preclude the usage of previously used curable resins which can be poured in an uncured state into the mold cavity to cure into hard rigid blocks, it has been found that the invention is particularly useful when the blocks are comprised of elastomeric material. Certain elastomers are commercially available which satisfy the operating requirements for dynamoelectric machine blocking. Further advantages are achieved by the invention when using an elastomer which will bond itself to the bar insulation while curing, so that it will not come out of place.

Although many types of curable elastomeric blocking material could be utilized in the method of the present invention, it has been found that a composition of urethane rubber provides an excellent formed-in-place stator end winding block. Liquid urethane, when cured to a solid state with a suitable curing agent, has good compression strength, good bonding qualities to the conductor bars, good electrical insulation qualities, high fatigue strength, and high tension strength. It also exhibits the desired viscoelastic behavior at dynamoelectric machine temperatures.

It has been found that urethane polymer rubber materials, which are commercially obtainable from the E. I. du Pont de Nemours Company under the trade names "Adiprene L–100" and "Adiprene L–167," have the above mentioned characteristics. These are liquid urethane rubbers which are converted to a tough elastic solid with a curing agent of methylene - bis - ortho - chloroaniline (MOCA).

In addition to the above characteristics, urethane polymers also have excellent resistance to abrasion, compression set, oils, solvents, oxidation, ozone, and low temperatures.

One advantage found to result from the use of an elastomeric blocking material such as urethane rubber is that it bonds to the insulation and other surrounding members. Another advantage is that it behaves elastically under static loading, but under dynamic or vibrational loading, strain lags the applied stress, so that energy is dissipated by internal damping.

Of course the main advantage in casting the liquid urethane rubber into the mold cavity is that it will conform to the surface areas of the conductor bars. This offers, during operation, a better and more uniform loading between conductor bars. The liquid urethane rubber will provide 100% uniform surface contact to both faces of the conductor bars, thereby eliminating point pressure loading because of high spots which can occur on the end turn portions of the insulated conductor bars. The liquid urethane rubber flows and also bonds well to the insulating material that surrounds the conductor bar as previously described. One skilled in the art can appreciate the advantages of the formed-in-place stator end winding blocks over the use of the hard pre-formed or shaped blocks which are manually inserted between adjacent bar members.

If a large generator is to be blocked using the method of the present invention, it expedites the process if all mold cavities are formed prior to pouring the liquid plastic material. After the molds have been formed, the first cavity is filled and then the generator is periodically or continuously rotated so as to bring the next cavity into suitable position so that gravity will cause uniform distribution of the liquid material. The rotation is at a rate whereby each spacer block is allowed to gel before rotating it to a point which otherwise would cause spillage. This process is carried out over the full 360° of the end turn region.

The MOCA curing agent which is added to the liquid urethane provides a curing time of from five minutes to 24 hours, depending upon the temperature at which curing occurs. The curing agent is of course mixed with the liquid urethane rubber and this mixture is then poured into the mold cavity 9. The urethane rubber when cured, either at room temperature or oven curing, becomes a tough elastic solid having a hardness range of from 80 to 95 Shore A to a Shore D hardness range of 70–80.

Thus it will be appreciated that the present invention provides a simple and efficient method for forming the spacer blocks between two bar members. By utilizing a liquid elastomeric material and in particular urethane rubber, a spacer block is formed which provides the desired characteristics. Further, by utilizing a resilient sponge strip to form the mold cavity, a very simple method of casting the block is provided.

While there has been described herein what is considered to be the preferred embodiment of the invention, other modifications will occur to those skilled in the art, and it is intended to cover in the appended claims all such modifications as wall within the true spirit and scope of the invention.

What is claimed is:

1. The method of forming, in place, an insulating blocking member for a dynamoelectric machine to hold circumferentially spaced conductor bars in spaced apart relationship, comprising the steps of:

inserting a strip of resilient rubber material between a pair of spaced adjacent conductor bars;
   elongating the strip of resilient rubber material as it is inserted between the conductor bars;
   bending the elongated strip of resilient rubber material to form a mold cavity having at least three sides and further defined by opposite adjacent sides of the spaced conductor bars;
   releasing the elongated strip of resilient rubber material so that the mold cavity is self-retaining between the pair of conductor bars;
   filling said cavity with liquid plastic material capable of conversion to a solid elastomer;
   curing said plastic material such that it becomes a solid elastomer, thereby forming in place, said blocking member.

2. The method as in claim 1 further including the step of removing said resilient rubber material from between said bars after said plastic material has cured.

3. The method as in claim 1 further including the step of periodically rotating said dynamoelectric machine about its own axis so that each mold cavity can be filled with said liquid plastic material as said dynamoelectric machine is rotated.

4. The method as in claim 1 which said resilient rubber material is a neoprene sponge rubber strip.

5. The method as in claim 1 in which said resilient rubber material is a silicone sponge rubber strip.

6. The method as in claim 1 in which said liquid plastic material is liquid urethane rubber.

References Cited

UNITED STATES PATENTS

| 3,449,609 | 6/1969 | Thiessen et al. | 310—260 |
| 3,353,220 | 11/1967 | Lenoble | 264—313 |
| 3,302,243 | 2/1967 | Ludwig | 264—244 |
| 2,994,735 | 8/1961 | Marshall et al. | 264—261 |
| 3,272,900 | 9/1966 | Rayan et al. | 264—261 |

ROBERT F. WHITE, Primary Examiner

G. AUVILLE, Assistant Examiner

U.S. Cl. X.R.

29—596; 264—313, 334; 310—260